United States Patent
Keffler

(10) Patent No.: US 11,143,222 B2
(45) Date of Patent: Oct. 12, 2021

(54) LATERALLY ADJUSTABLE HOOKS

(71) Applicant: John Keffler, Evergreen, CO (US)

(72) Inventor: John William Keffler, Evergreen, CO (US)

(73) Assignee: Phantom Snow Industries LLC, Evergreen, CO (US)

( * ) Notice: Subject to any disclaimer, the term of this patent is extended or adjusted under 35 U.S.C. 154(b) by 604 days.

(21) Appl. No.: 15/840,345

(22) Filed: Dec. 13, 2017

(65) Prior Publication Data

US 2018/0180078 A1    Jun. 28, 2018

Related U.S. Application Data

(60) Provisional application No. 62/439,097, filed on Dec. 26, 2016.

(51) Int. Cl.
| | |
|---|---|
| *F16B 5/02* | (2006.01) |
| *F16B 5/07* | (2006.01) |
| *F16B 37/04* | (2006.01) |
| *F16B 5/00* | (2006.01) |
| *F16B 35/00* | (2006.01) |

(52) U.S. Cl.
CPC .............. *F16B 5/0233* (2013.01); *F16B 5/07* (2013.01); *F16B 5/0092* (2013.01); *F16B 35/005* (2013.01); *F16B 37/047* (2013.01)

(58) Field of Classification Search
CPC ........ F16B 5/02; F16B 5/0216; F16B 5/0233; F16B 5/0225; F16B 5/07; F16B 5/0004; F16B 5/0012; F16B 5/0036; F16B 5/0084; F16B 5/0088; F16B 5/0092; F16B 35/005; F16B 35/002; F16B 37/047; F16B 37/045; F16B 37/04; A63C 5/03; A63C 5/031; A63C 5/033; A63C 5/02; A63C 10/14; A63C 2203/06; A63C 2203/10

USPC ..................... 403/71, 80, 353, 362

See application file for complete search history.

(56) References Cited

U.S. PATENT DOCUMENTS

| | | | | |
|---|---|---|---|---|
| 4,518,349 | A | * | 5/1985 | Tressler .................. C30B 31/14 432/11 |
| 5,984,324 | A | * | 11/1999 | Wariakois ................ A63C 5/02 280/14.24 |
| 6,102,430 | A | * | 8/2000 | Reynolds ............... A63C 10/18 280/618 |

(Continued)

OTHER PUBLICATIONS

Karakoram Splitboard Clips, screen capture from https://www.splitboardbindings.com/shop/splitboard-clips-17/, accessed Oct. 17, 2018.

(Continued)

*Primary Examiner* — Amber R Anderson
*Assistant Examiner* — Alexus Camero
(74) *Attorney, Agent, or Firm* — Elevated IP, LLC

(57) ABSTRACT

Laterally adjustable hooks may be used to join two or more substantially planar parts, such as two halves of a splitboard. In an embodiment, a laterally adjustable hook comprises a unitary body having a top surface, a bottom surface, a main portion and a nose portion, with the main portion comprising at least one oblong, beveled slot and the nose portion extending from an end of the main portion. A screw or wedge nut may be used to apply pressure to edges of the oblong, beveled slot, and a pair of set screws may contact and laterally secure the wedge nut.

20 Claims, 16 Drawing Sheets

(56) References Cited

U.S. PATENT DOCUMENTS

| | | | | |
|---|---|---|---|---|
| 9,022,412 B2* | 5/2015 | Ritter | ............... | A63C 5/03 |
| | | | | 280/618 |
| 2016/0186569 A1* | 6/2016 | Choi | ............... | F01D 11/008 |
| | | | | 416/214 A |
| 2016/0310824 A1* | 10/2016 | Kloster | ............... | A63C 5/02 |

OTHER PUBLICATIONS

Karakoram Ultraclips, screen capture from https://www.splitboardbindings.com/shop/ultraclips-17/, accessed Oct. 17, 2018.

Nitro Splitboard Hooks, screen capture from https://www.nitrousa.com/mens-board-collection/doppleganger/, accessed. Oct. 17, 2018.

Plum Splitboard Hooks, screen capture from https://www.fixation-plum.com/en/mountain-accessories/6000-crochets-wom.html, accessed Oct. 17, 2018.

Prouder Splitboard Clips, screen capture from http://www.prowder.com/product/cowboy-clips/, accessed Oct. 17, 2018.

Spark Crossbar Clips, screen capture from https://www.sparkrandd.com/gear/crossbar-clips/, accessed Oct. 17, 2018.

Voile Split Hooks, screen capture from http://www.voile.com/voile-split-hooks.html, accessed Oct. 17, 2018.

* cited by examiner

ITEM: CHANNEL NUT
PN: CN-SAE
REVISION: D
MAT'L: 6061-T6

....OR....

```
ITEM: CHANNEL NUT
PN: CN-SAE
REVISION: F
MAT'L: 6061-T6
```

LATERALLY ADJUSTABLE HOOKS

CROSS-REFERENCE TO RELATED APPLICATIONS

This application claims the benefit of and priority to U.S. Provisional Patent Application No. 62/439,097, filed Dec. 26, 2016, which is hereby incorporated by reference in its entirety.

BACKGROUND

There are many circumstances where it is desirable to join two or more substantially planar surfaces to one another. For example, the two halves of a splitboard are typically secured to one another when the board is assembled for downhill travel, by toe and tail clips, as well one or more sets of interlocking hooks that prevent gaps along the length of the center seam of the splitboard. U.S. Pat. No. 5,984,324 describes one interlocking hook system involving rotatable hooks. However, this system and other known interlocking hook systems are not adjustable, meaning the placement of the hooks cannot be altered without redrilling the splitboard, which may weaken the splitboard and lead to mechanical failure. Therefore, correct mounting of the hook system is time consuming and errors are costly.

SUMMARY

The present invention includes a laterally adjustable hook that may be used to join two or more substantially planar parts. The laterally adjustable hooks of the present invention allow adjustments to be made without redrilling the parts being joined. Therefore, installation is faster and occurs with fewer mounting errors than with existing hooks. An installer need not allow "a margin of error" when mounting the hooks because precise and effective hook-to-hook contact and edge-to-edge contact can be achieved by laterally adjusting the hooks even after the parts being joined have been drilled. Typically, the hooks are adjusted initially to obtain the proper fit and then the hooks stay fixed in place indefinitely or for an extended period of time.

In one embodiment, the substantially planar parts being joined may be two halves of a splitboard. In this case, the laterally adjustable hooks can accommodate variability in splitboard manufacturing and can ensure that the splitboard halves are held together tightly even as the splitboard wears.

In another embodiment, the substantially planar parts being joined are construction materials, such as planks, sheets, slabs and the like. The construction materials may be wood, plastic, metal, glass, concrete, stone or combinations thereof.

In an aspect, a laterally adjustable hook comprises a unitary body having a top surface, a bottom surface, a main portion and a nose portion, with the main portion comprising at least one oblong, beveled slot and the nose portion extending from an end of the main portion.

In an embodiment, the nose portion extends substantially perpendicularly from the main portion. In some embodiments, the nose portion extends from the main portion in only one direction. In some embodiments, the nose portion extends from the main portion in both directions, forming a "T" shape, so that all hooks can mate with each other.

In an embodiment, the beveled slot is wider at the top surface of the unitary body than at the bottom surface of the unitary body. For example, the edges of the beveled slot may be sloped, stepped or curved to achieve a narrowing of the slot when viewed in cross section from the top surface to the bottom surface. In some embodiments, the laterally adjustable hook has one oblong, beveled slot. In some embodiments, the laterally adjustable hook has two oblong, beveled slots. In some embodiments, the laterally adjustable hook has more than two oblong, beveled slots.

In an embodiment, a laterally adjustable hook comprises a pair of set screw holes in the unitary body, wherein the set screw holes are disposed substantially along a vertical, longitudinal plane bifurcating the oblong, beveled slot. In an embodiment, the set screw holes are threaded.

In an embodiment, a distal end of the nose portion is rounded. For example, edges of the unitary body may be rounded while the top surface and the bottom surface of the unitary body are coplanar. In another embodiment, edges of the unitary body may be rounded, the top surface of the nose portion may be bulbous, and the bottom surface of the unitary body may be substantially flat. In another embodiment, the top surface, the bottom surface or both the top surface and the bottom surface of the unitary body are substantially flat and substantially smooth. A smooth surface may, for example, avoid ice build-up.

In an embodiment, a laterally adjustable hook further comprises a substantially flat contact surface along an edge of the hook between the main portion and the nose portion. For example, the substantially flat contact surface may form an interface area with the nose portion of a second hook for forming an interlocking pair of hooks or a hook system comprising a pair of mating or matched hooks.

In an embodiment, a laterally adjustable hook further comprises a rounded notch between the substantially flat contact surface and the nose portion. This notch may serve as a "weep hole" for snow, ice or water to escape the system when two hooks are mated or interlocked.

In an embodiment, the unitary body of the adjustable hook is made of a material selected from the group consisting of stainless steel, steel, plastic, carbon fiber, aluminum, titanium, magnesium, gold, silver, alloys comprising aluminum, titanium, magnesium, gold and/or silver and combinations of any of these materials.

In an embodiment, a laterally adjustable hook is fabricated by a method selected from the group consisting of 3D printing, casting, laser cutting, waterjet cutting, hand cutting and machining, computer numeric control (CNC) machining and combinations thereof.

In an aspect, a method for connecting edges of substantially planar parts comprises: placing the bottom surface of a laterally adjustable hook on a top surface of a first substantially planar part; aligning the laterally adjustable hook with the main portion of the hook on the top surface of the first substantially planar part and with the nose portion of the hook extending past the edge of the first substantially planar part; providing a wedge nut in the oblong, beveled slot of the laterally adjustable hook; driving at least one screw through a bottom surface of the first substantially planar part into at least one hole in the wedge nut; aligning the edge of the first substantially planar part with an edge of a second substantially planar part; mating a nose portion of a second laterally adjustable hook with the nose portion of the laterally adjustable hook; providing a second wedge nut in an oblong, beveled slot of the second laterally adjustable hook; and driving at least one screw through a bottom surface of the second substantially planar part into at least one hole in the second wedge nut.

In an aspect, a method for connecting edges of substantially planar parts comprises: placing the bottom surface of a laterally adjustable hook on a top surface of a first substantially planar part; aligning the laterally adjustable hook with the main portion of the hook on the top surface of the first substantially planar part and with the nose portion of the hook extending past the edge of the first substantially planar part; providing a wedge nut in the oblong, beveled slot of the laterally adjustable hook; driving at least one screw through a bottom surface of the first substantially planar part into at least one hole in the wedge nut; aligning the edge of the first substantially planar part with an edge of a second substantially planar part; mating a nose portion of a second hook with the nose portion of the laterally adjustable hook; and securing the second hook to the second substantially planar part. In an embodiment, the second hook is non-adjustable or not laterally adjustable. In an embodiment, the second hook is any one of the laterally adjustable hooks described herein.

In an embodiment, the step of aligning the edge of the first substantially planar part with the edge of the second substantially planar part comprises translating the edges relative to one another.

In an embodiment, a step of adjusting a laterally adjustable hook comprises loosening one or more screws securing a wedge nut, sliding the unitary body relative to the wedge nut, and tightening the one or more screws to re-secure the wedge nut.

In an embodiment, the first and second substantially planar parts are portions of a splitboard.

In an aspect, a laterally adjustable hook system comprises a laterally adjustable hook and at least one screw for applying pressure to edges of the oblong, beveled slot.

In an aspect, a laterally adjustable hook system comprises a laterally adjustable hook and a wedge nut for applying pressure to edges of the oblong, beveled slot.

In an embodiment, a length of the wedge nut is less than a length of the oblong, beveled slot.

In an embodiment, the wedge nut comprises at least one screw hole that may be threaded or unthreaded.

In an embodiment, the wedge nut has a substantially trapezoidal, square, diamond, triangular, hexagonal, circular or truncated circular cross-section. In an embodiment, edges of the wedge nut comprise at least one stepped feature. Generally, the wedge nut may have any cross-sectional shape that is wider at a middle and/or top portion than at a bottom portion, such that when the wedge nut is placed in the beveled slot it applies pressure to edges of the beveled slot.

In an embodiment, the top surface of the wedge nut is flush with the top surface of the unitary body when the wedge nut is disposed in the beveled slot. In an embodiment, the top surface of the wedge nut is above or below the top surface of the unitary body when the wedge nut is disposed in the beveled slot.

In an embodiment, the wedge nut slidably engages with the oblong, beveled slot.

In an embodiment, a laterally adjustable hook system further comprises a pair of set screws for contacting and laterally securing a wedge nut.

In an aspect, a laterally adjustable hook system, comprises: a unitary body having a top surface, a bottom surface, a main portion and a nose portion, the main portion comprising at least one oblong, beveled slot and the nose portion extending from an end of the main portion; a pair of set screw holes in the unitary body, wherein the set screw holes are disposed substantially along a vertical, longitudinal plane bifurcating the oblong, beveled slot; a wedge nut for applying pressure to edges of the oblong, beveled slot; and a pair of set screws for contacting and laterally securing the wedge nut.

In an aspect, a splitboard comprises at least one of the laterally adjustable hooks disclosed herein.

In an aspect, a laterally adjustable hook comprises a unitary body having a top surface, a bottom surface, a main portion and a nose portion, with the main portion comprising at least one oblong slot and the nose portion extending from an end of the main portion. For example, the oblong slot may be unbeveled. Pressure may be applied to the unbeveled slot by a screw head, wedge nut or oblong "T" nut.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

A "system" is a combination of components operably connected to produce one or more desired functions.

A "component" is used broadly to refer to an individual part of a system.

The terms "direct and indirect" describe the actions or physical positions of one component relative to another component, or one system relative to another system. For example, a component that "directly" acts upon or touches another component does so without intervention from an intermediary. Contrarily, a component that "indirectly" acts upon or touches another component does so through an intermediary (e.g., a third component).

As used herein, the term "oblong" refers to an elongated shape having at least one lateral dimension longer than another lateral dimension of the shape. A two-dimensional oblong shape may, for example, be an oval or a rectangle. A three-dimensional oblong shape may have at least one cross-section that is an oval or a rectangle.

As used herein, the terms "beveled" and "tapered" are used interchangeably to describe an area or volume that is diminished or reduced toward one end. Typically, a beveled or tapered object gradually diminishes in area or volume across at least one dimension, but the beveled or tapered object may alternatively abruptly diminish in area or volume (e.g., step-wise) or it may diminish in area or volume and then expand again (e.g., in an hourglass shape).

As used herein, "laterally adjustable" means capable of being moved from one position to another position in a direction substantially perpendicular to an edge of a planar surface.

Figure 1:
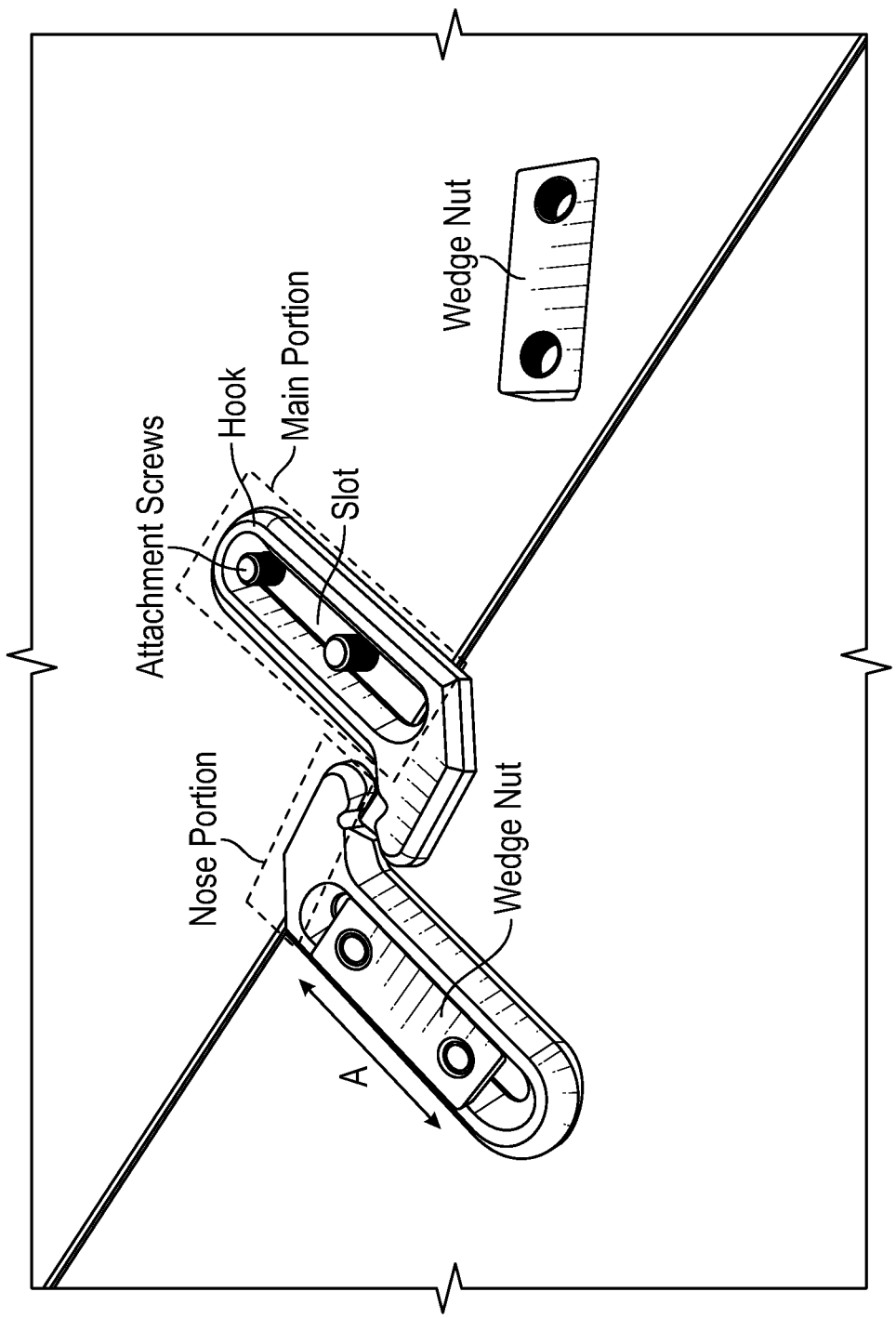
FIG. 1 shows labeled components of a laterally adjustable hook system, according to an embodiment of the invention.

FIG. 1 shows labeled components of a laterally adjustable hook system, according to an embodiment of the invention. As shown, a laterally adjustable hook comprises a unitary body having a top surface, a bottom surface (interfacing with the underlying part), a main portion and a nose portion. The main portion comprises an oblong, beveled slot and the nose portion extends substantially perpendicularly in one direction from an end of the main portion. A distal end of the nose portion is rounded at edges of the unitary body, while both the top surface and the bottom surface of the unitary body are substantially flat and substantially smooth. The rounded nose portion helps to displace snow, ice or debris on the surfaces of parts being joined as the parts and hooks slide together. As shown, a wedge nut is secured within one of the beveled slots by a pair of attachment screws applied from a bottom of the part (e.g., a splitboard). The placement of the attachment screws is shown on the right side of the photograph without the wedge nut in place for illustrative purposes.

A laterally adjustable hook of the present invention may be moved in one dimension (laterally) as shown by arrow "A" of FIG. 1 by loosening the attachment screw(s), which loosens the connection between the hook and wedge nut if present, sliding the hook to the desired position, and retightening the attachment screw(s).

Figure 2:
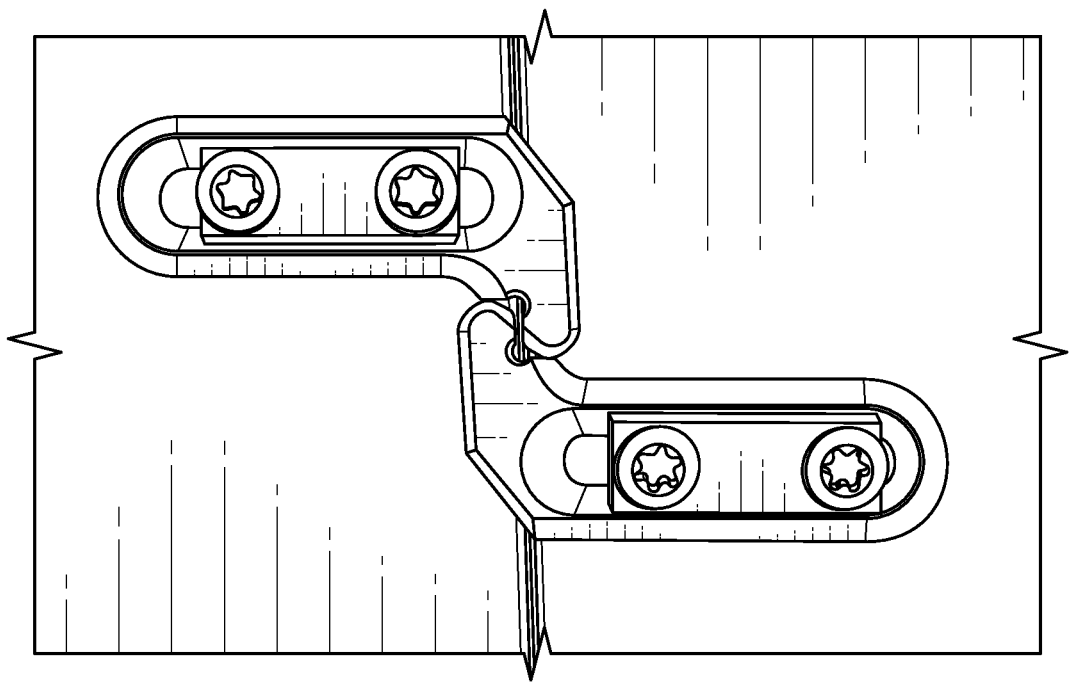
FIG. 2 is a picture of a laterally adjustable hook system showing two hooks each having a wedge nut disposed in an oblong, beveled slot, where each wedge nut is secured with a pair of screws applied to a top surface of the wedge nut; according to an embodiment of the invention.

FIG. 2 is a picture of a laterally adjustable hook system showing two hooks each having a wedge nut disposed in an oblong, beveled slot, where each wedge nut is secured with a pair of screws applied to a top surface of the wedge nut, according to an embodiment of the invention.

Figure 3:
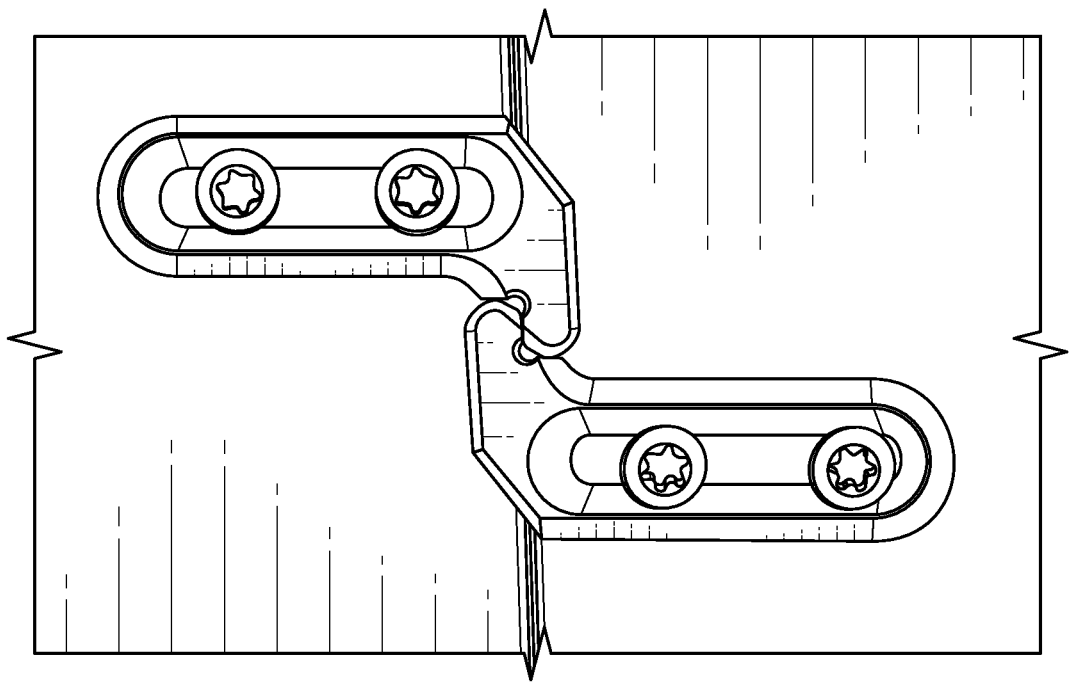
FIG. 3 is a picture of a laterally adjustable hook system showing two hooks secured, without wedge nuts, by screws applied from a top surface of the hook, according to an embodiment of the invention.

FIG. 3 is a picture of a laterally adjustable hook system showing two hooks secured, without wedge nuts, by screws applied from a top surface of the hook, according to an embodiment of the invention.

Figure 4:
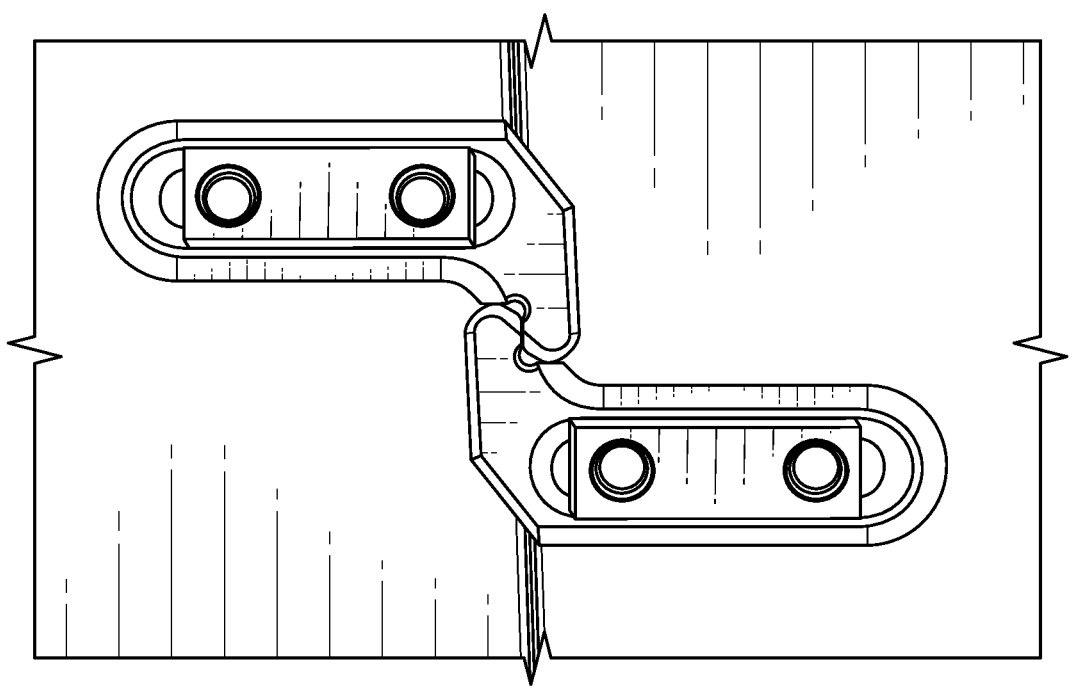
FIG. 4 is a picture of a laterally adjustable hook system showing two hooks each having a wedge nut disposed in an oblong, beveled slot, where each wedge nut is secured with a pair of screws applied to a bottom surface of the wedge nut (e.g., applied indirectly to the bottom surface of the wedge nut through an intermediary part), according to an embodiment of the invention.

FIG. 4 is a picture of a laterally adjustable hook system showing two hooks each having a wedge nut disposed in an oblong, beveled slot, where each wedge nut is secured with a pair of screws applied to a bottom surface of the wedge nut (e.g., applied indirectly to the bottom surface of the wedge nut through an intermediary part), according to an embodiment of the invention.

In each of FIGS. 2-4, a substantially flat contact surface along an edge of the hook between the main portion and the nose portion is visible. This substantially flat contact surface forms an interface area with the nose portion of a second hook, which stops translation of the two substantially planar parts relative to one another. In addition, a rounded notch between the substantially flat contact surface and the nose portion of each hook is visible. This notch serves as a "weep hole" for snow, ice or water to escape the system when two hooks are mated or interlocked.

Figure 5:
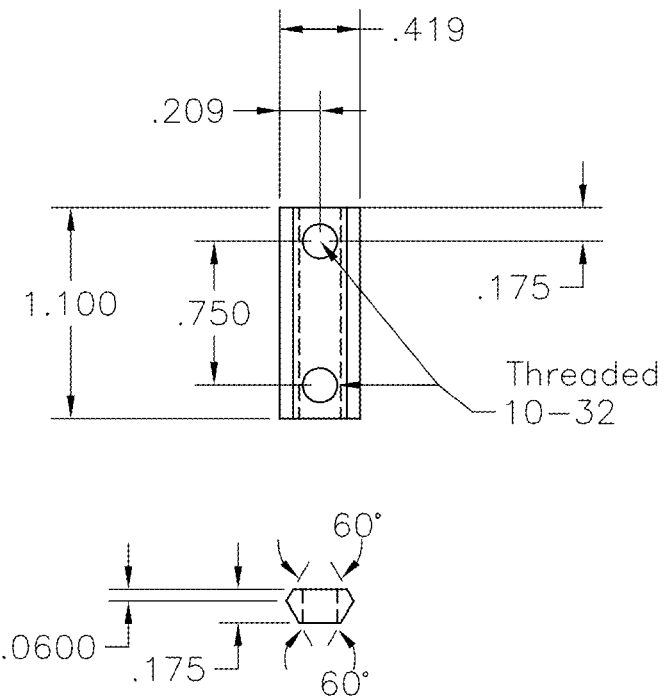
FIG. 5 provides top plan and end plan views of technical drawings for a wedge nut having a substantially hexagonal shape, according to an embodiment of the invention.
Figure 6:
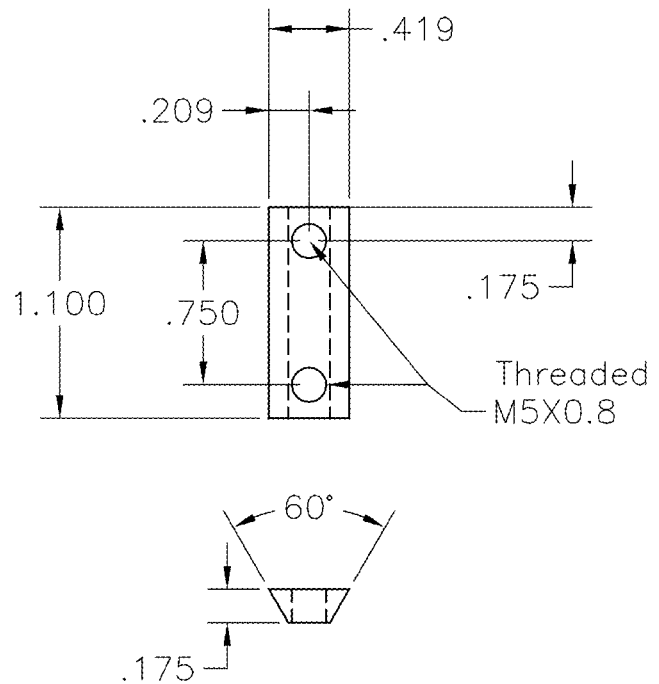
FIG. 6 provides top plan and end plan views of technical drawings for a wedge nut having a substantially trapezoidal shape, according to an embodiment of the invention.
Figure 7:
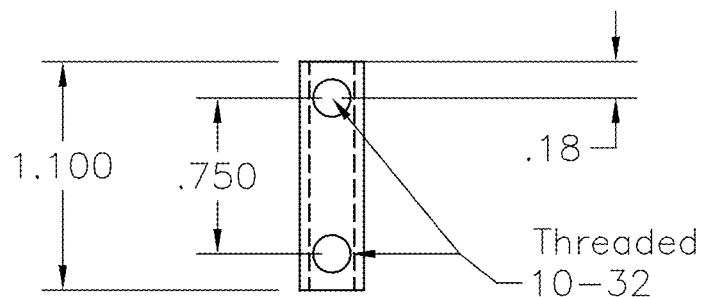
FIG. 7 provides top plan and end plan views of technical drawings for a wedge nut having a substantially truncated circular shape, according to embodiments of the invention.
Figure 7:
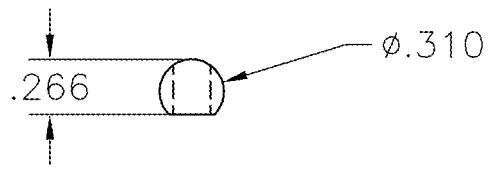
Figure 7:
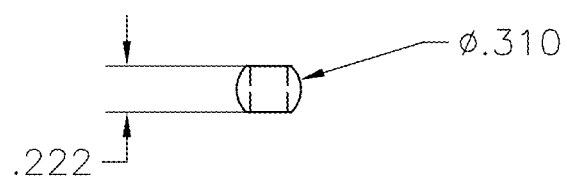

FIG. 5 provides top plan and end plan views of technical drawings for a wedge nut having a substantially hexagonal shape, according to an embodiment of the invention. FIG. 6 provides top plan and end plan views of technical drawings for a wedge nut having a substantially trapezoidal shape, according to an embodiment of the invention. FIG. 7 provides top plan and end plan views of technical drawings for a wedge nut having a substantially truncated circular shape, according to embodiments of the invention.

Figure 8:
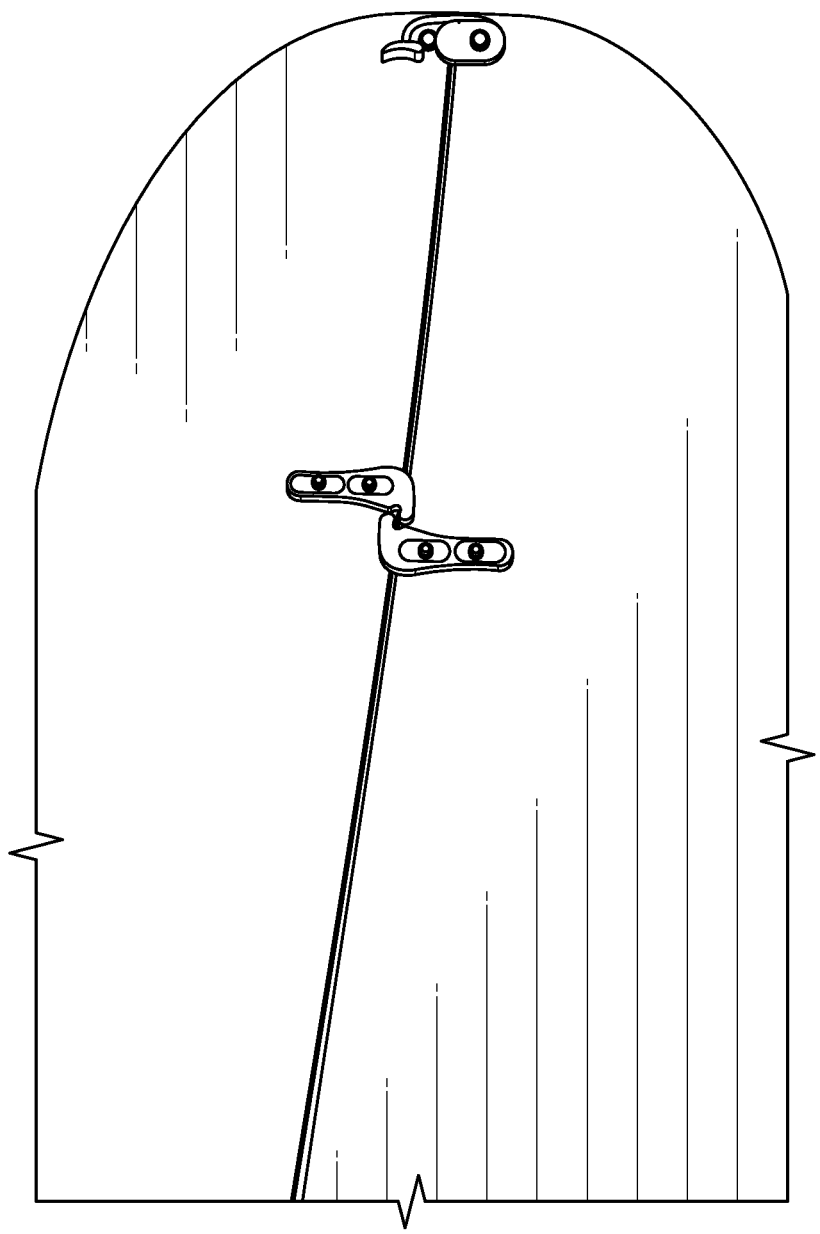
FIG. 8 is a picture of a splitboard joined by a laterally adjustable hook system, where each hook comprises two oblong, beveled slots, according to an embodiment of the invention.

FIG. 8 is a picture of a splitboard joined by a laterally adjustable hook system, where each hook comprises two oblong, beveled slots, according to an embodiment of the invention.

Figure 9:
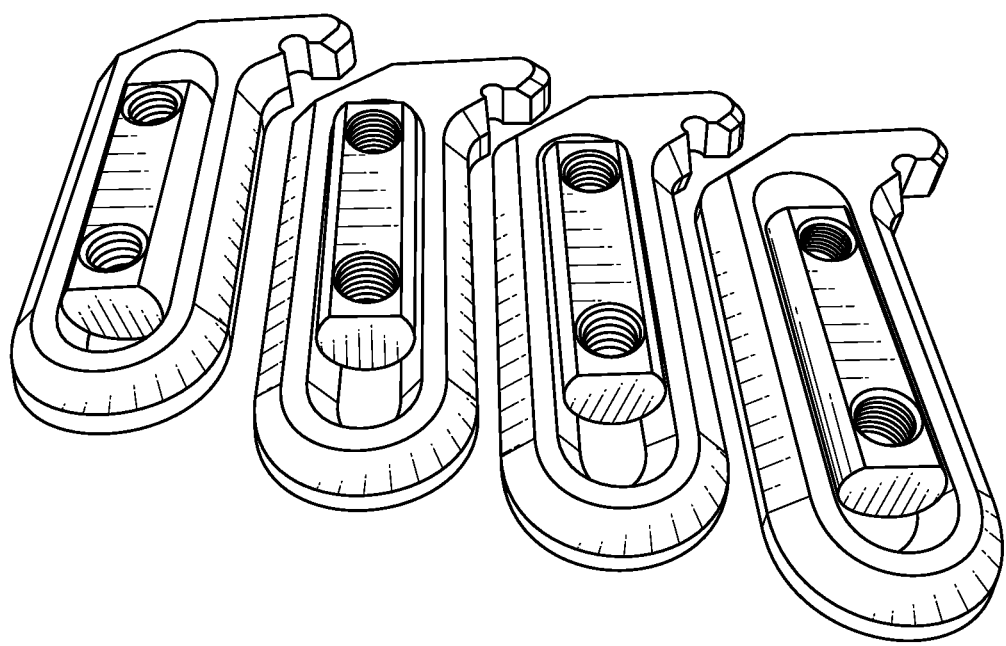
FIG. 9 shows pictures of hooks and wedge nuts made of various materials, according to embodiments of the invention.
Figure 10:
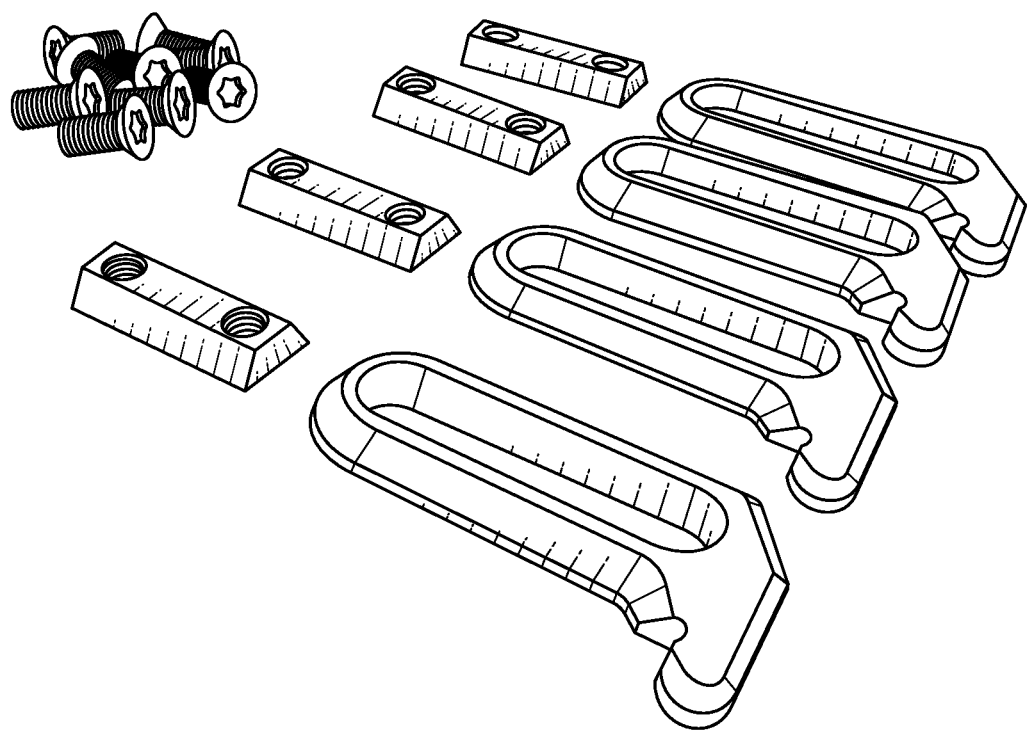
FIG. 10 shows pictures of CNC produced hooks, substantially trapezoidal wedge nuts, and countersunk screws, according to an embodiment of the invention.

FIG. 9 shows pictures of hooks and wedge nuts made of various materials, according to embodiments of the invention. Laterally adjustable hooks and wedge nuts of the present invention may be made of a material selected from the group consisting of stainless steel, steel, plastic, carbon fiber, aluminum, titanium, magnesium, gold, silver, alloys comprising aluminum, titanium, magnesium, gold and/or silver and combinations of any of these materials. Further, laterally adjustable hooks and wedge nuts may be fabricated by a method selected from the group consisting of 3D printing, casting, laser cutting, waterjet cutting, hand cutting and machining, computer numeric control (CNC) machining and combinations thereof. For example, FIG. 10 shows pictures of CNC produced hooks, substantially trapezoidal wedge nuts, and countersunk screws, according to an embodiment of the invention.

Figure 11:
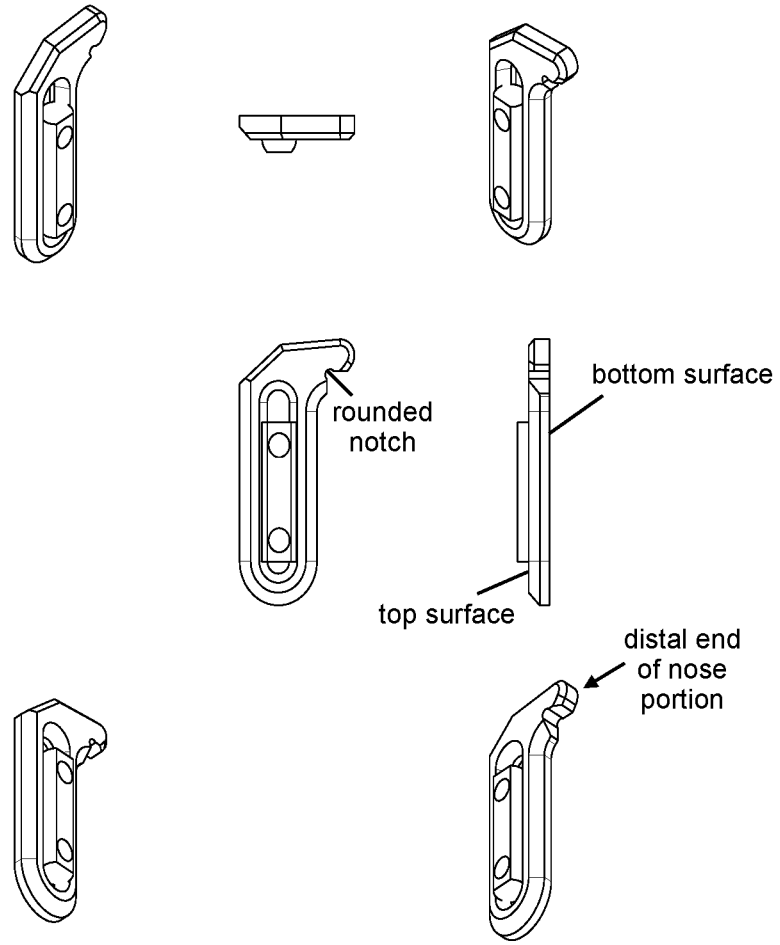
FIG. 11 shows schematic views of a hook having a wedge nut in the oblong, beveled slot, according to embodiments of the invention.
Figure 12:
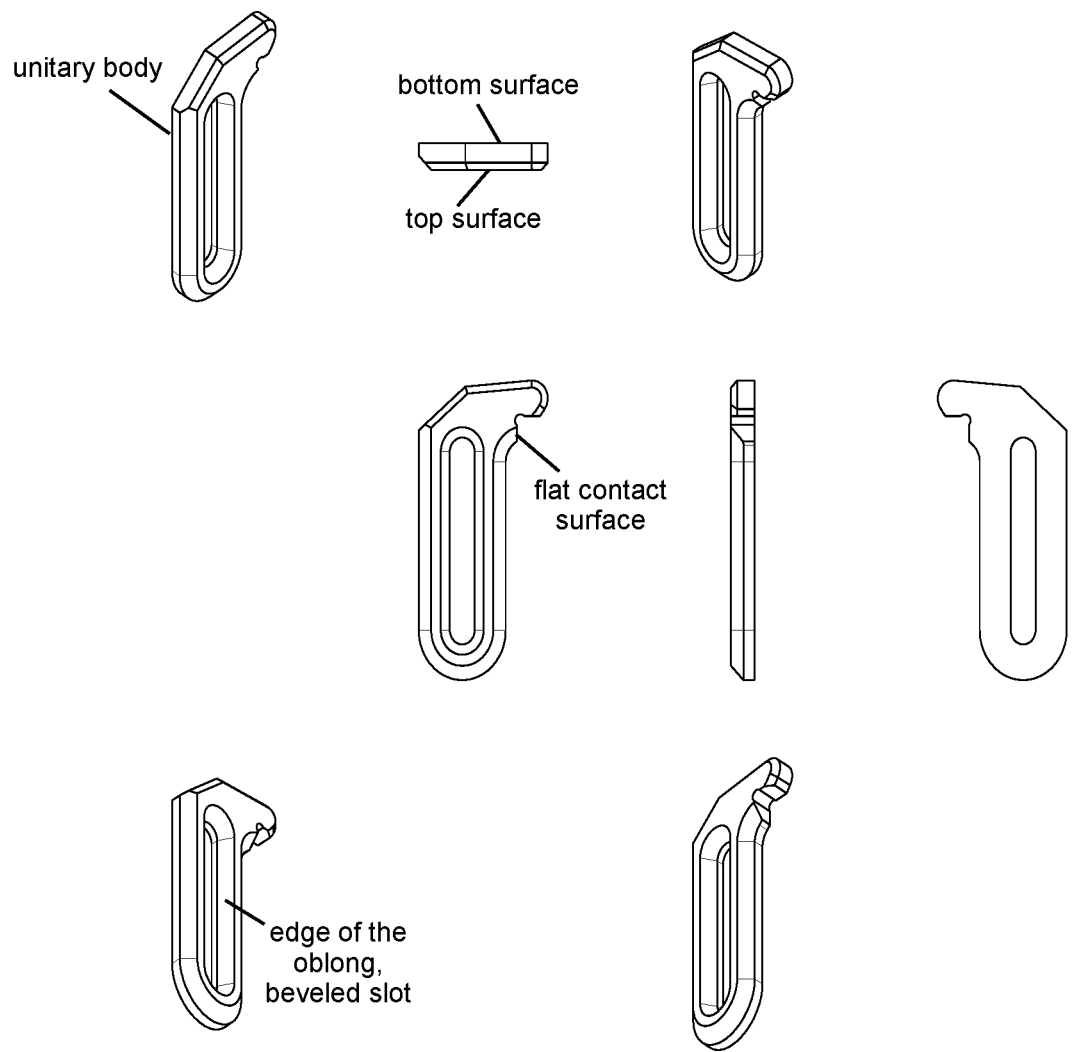
FIG. 12 shows schematic views of a hook, without a wedge nut in the oblong, beveled slot, according to embodiments of the invention.

FIG. 11 shows schematic views of a hook having a wedge nut in the oblong, beveled slot, according to embodiments of the invention. FIG. 12 shows schematic views of a hook, without a wedge nut in the oblong, beveled slot, according to embodiments of the invention.

Figure 13:
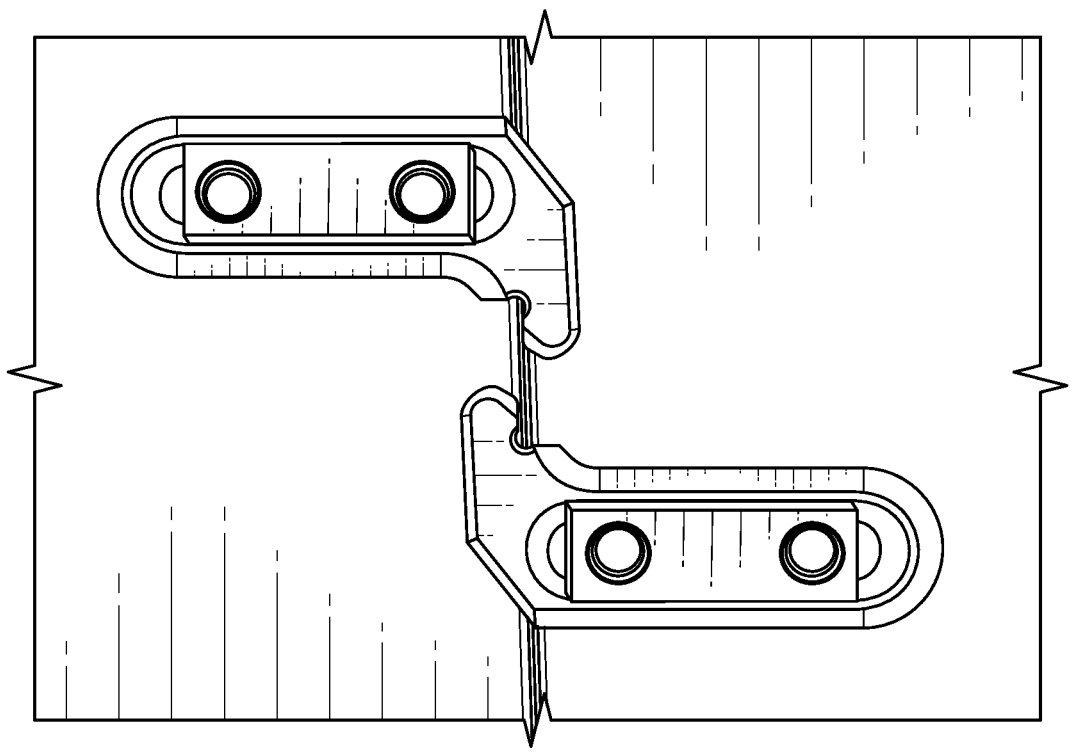
FIG. 13 is a picture of a mounted laterally adjustable hook system prior to translation of the substantially planar parts, which causes the hooks to interlock as shown in FIG. 4.

FIG. 13 is a picture of a mounted laterally adjustable hook system prior to translation of the substantially planar parts, which causes the hooks to interlock as shown in FIG. 4. Again, the rounded end of the nose portion, substantially flat contact surface and rounded notch between the substantially flat contact surface and the nose portion of each hook are visible.

Figure 14:
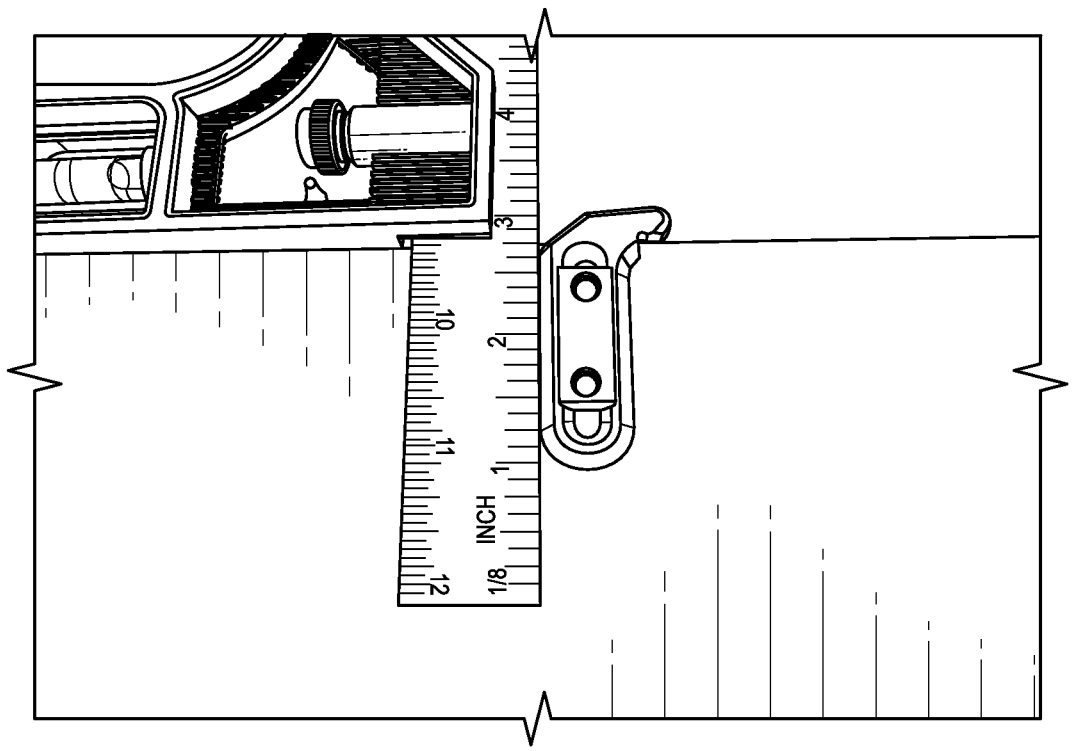
FIG. 14 is a picture of a step in the mounting process wherein a main portion of the hook is disposed on a substantially planar part and a nose portion of the hook extends beyond an edge of the substantially planar part, according to an embodiment of the invention.

FIG. 14 is a picture of a step in the mounting process wherein a main portion of the hook is disposed on a substantially planar part and a nose portion of the hook extends beyond an edge of the substantially planar part, according to an embodiment of the invention. For optimal precision, a square may be used to align the main portion of the hook perpendicular to the inner edge of the splitboard with the inner area of the nose portion aligned with the splitboard seam. A wedge nut is provided in the oblong, beveled slot of the laterally adjustable hook and two screws are driven through a bottom surface of the splitboard and threaded into the wedge nut. Then, with the splitboard halves in alignment, a nose portion of a second laterally adjustable hook is mated with the first laterally adjustable hook, a second wedge nut is provided in an oblong, beveled slot of the second laterally adjustable hook, and two screws are driven through a bottom surface of the splitboard and threaded into the second wedge nut. For optimal connection, the position of the second laterally adjustable hook may be marked, the two halves of the splitboard separated and the second hook biased slightly toward the outer (unjoined) edge of the splitboard prior to tightening the screws. In an embodiment, only one of the hooks is a laterally adjustable hook, which can be mated to a non-adjustable hook.

Figure 15:
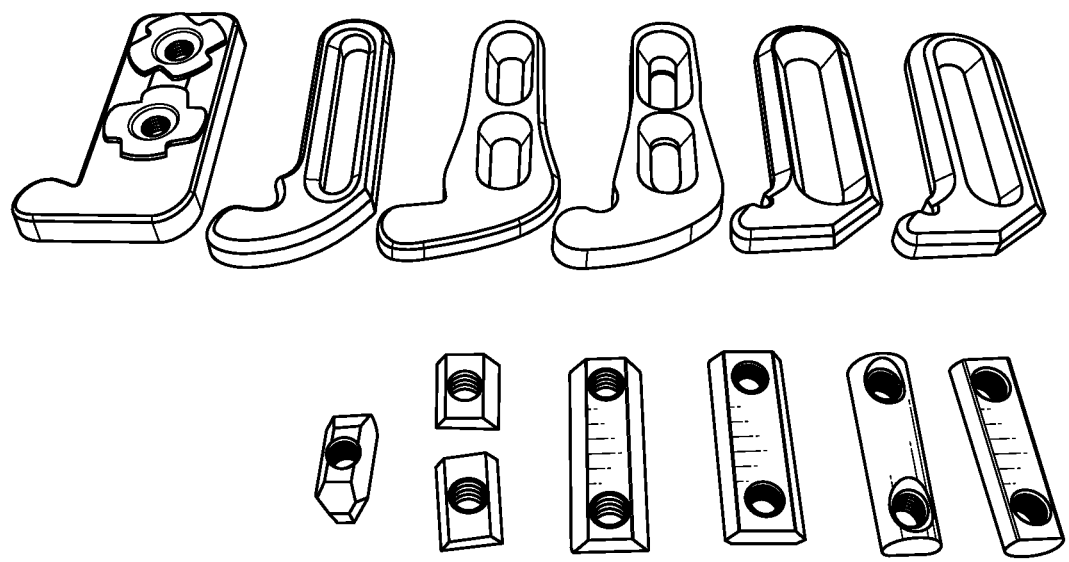
FIG. 15 is a picture of various hook designs and wedge nut designs, according to embodiments of the invention.

FIG. 15 is a picture of various hook designs and wedge nut designs, according to embodiments of the invention. The hook on the far left side of the photograph includes inserts for receiving attachment screws.

Figure 16:
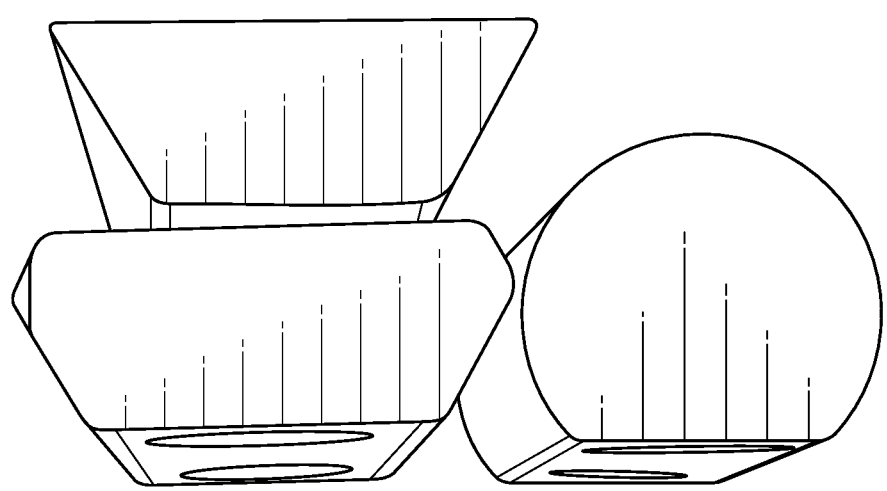
FIG. 16 shows end views of three different wedge nuts having different cross sectional profiles, according to embodiments of the invention.
Figure 17:
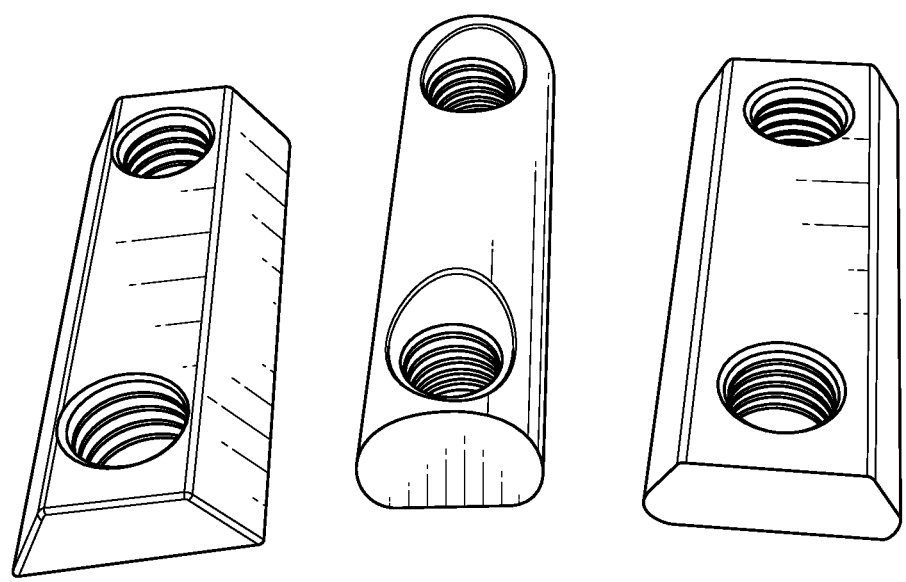
FIG. 17 shows perspective views of three different wedge nuts having different cross sectional profiles, according to embodiments of the invention.

FIG. 16 shows end views of three different wedge nuts having different cross sectional profiles, according to embodiments of the invention. FIG. 17 shows perspective views of three different wedge nuts having different cross sectional profiles, according to embodiments of the invention. Wedge nut form factors were selected to provide substantially even pressure over the contact area between the bottom surface of the hook and the top surface of the substantially planar part (e.g., splitboard) and between the wedge nut and the hook.

For splitboards with built-in threaded inserts, a screw can be threaded into the inserts to secure the hook to the splitboard. A wedge nut for this embodiment may comprise unthreaded, through-holes.

Figure 18:
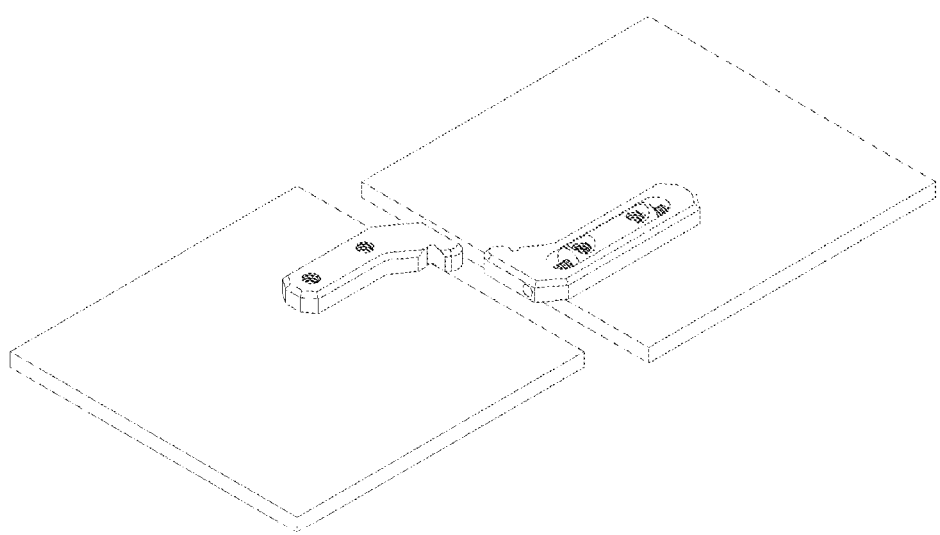
FIG. 18 shows a top perspective schematic of a laterally adjustable hook system adapted to receive set screws (right side of FIG. 18), according to an embodiment of the invention.

FIG. 18 shows a top perspective schematic of a laterally adjustable hook system adapted to receive set screws (right side of FIG. 18). The laterally adjustable hook system is shown as being mated with a non-adjustable hook system (left side of FIG. 18), which may simplify installation and/or reduce manufacturing costs of the hook set. However, instead of being mated with a non-adjustable hook system, the laterally adjustable hook system of FIG. 18 may, in some embodiments, be mated with any of the laterally adjustable hook systems described herein.

The laterally adjustable hook of FIG. 18 comprises a pair of set screw holes in the unitary body, where the set screw holes are disposed substantially along a vertical, longitudinal plane (shown as dashed line B-B in FIG. 19) bifurcating the oblong, beveled slot. Set screws threaded through the set screw holes of the unitary body and abutting the wedge nut in the oblong, beveled slot allow for fine tuned adjustment of the position of the laterally adjustable hook relative to the wedge nut, before the system is fully tightened, and the set screws provide mechanical resistance against lateral movement, after the system is fully tightened.

Figure 19:
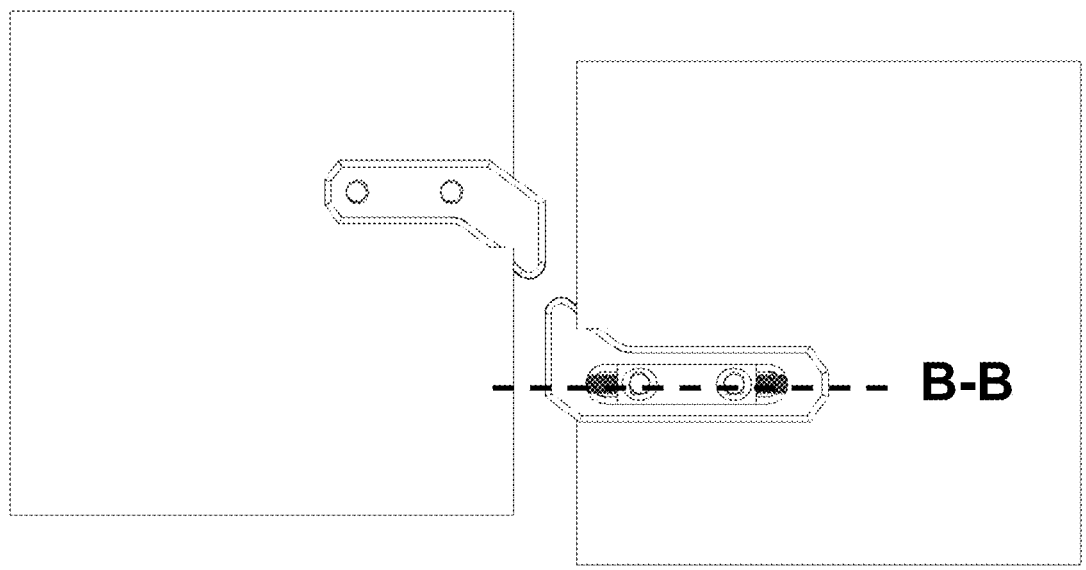
FIG. 19 shows a top plan view of the laterally adjustable hook system of FIG. 18 mounted to separated, planar surfaces, according to an embodiment of the invention.
Figure 20:
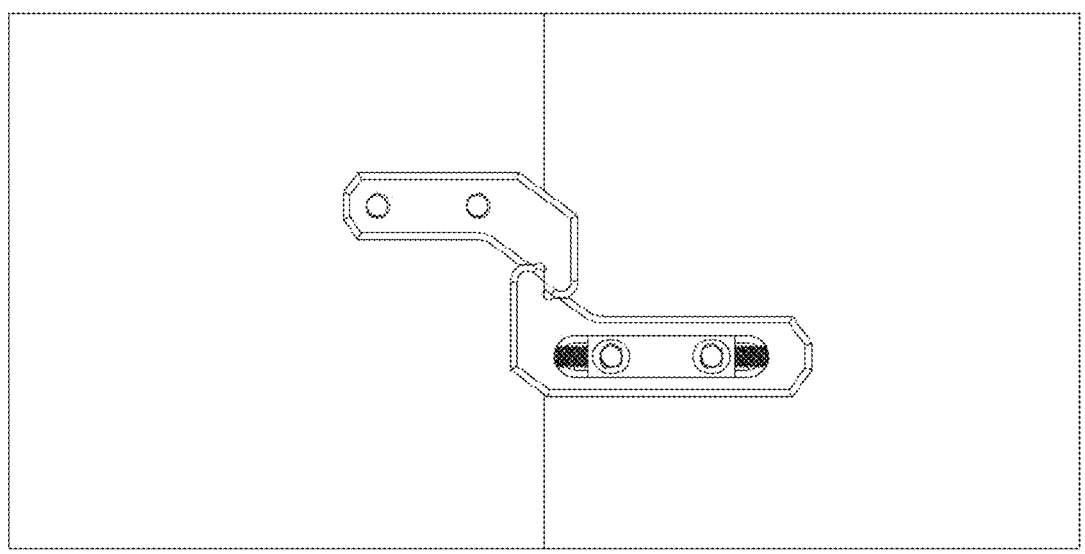
FIG. 20 shows a top plan view of the laterally adjustable hook system of FIG. 19 when the planar surfaces are mated.

FIG. 19 shows a top plan view of the laterally adjustable hook system of FIG. 18 mounted to separated, planar surfaces. FIG. 20 shows a top plan view of the laterally adjustable hook system of FIG. 19 when the planar surfaces are mated.

Figure 21:
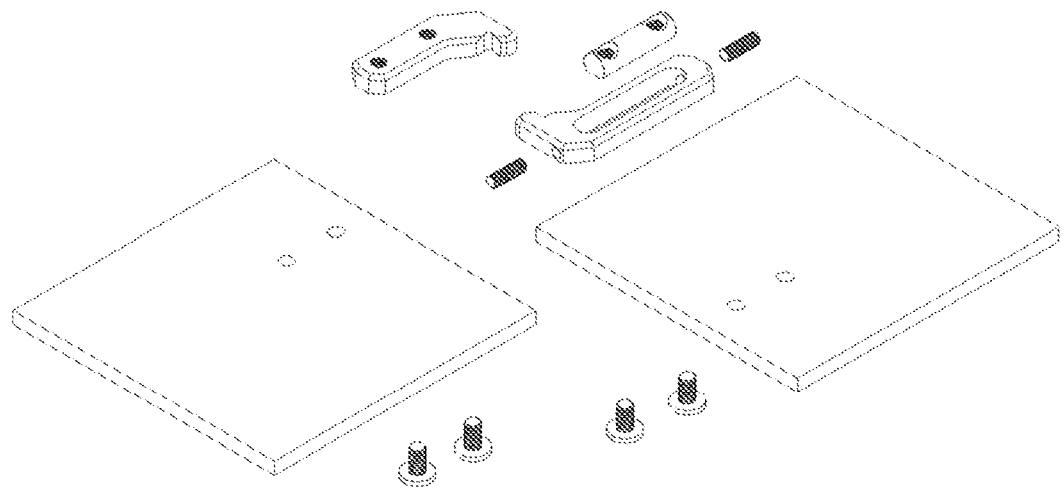
FIG. 21 shows an exploded view of the system of FIGS. 18-20.
Figure 22:
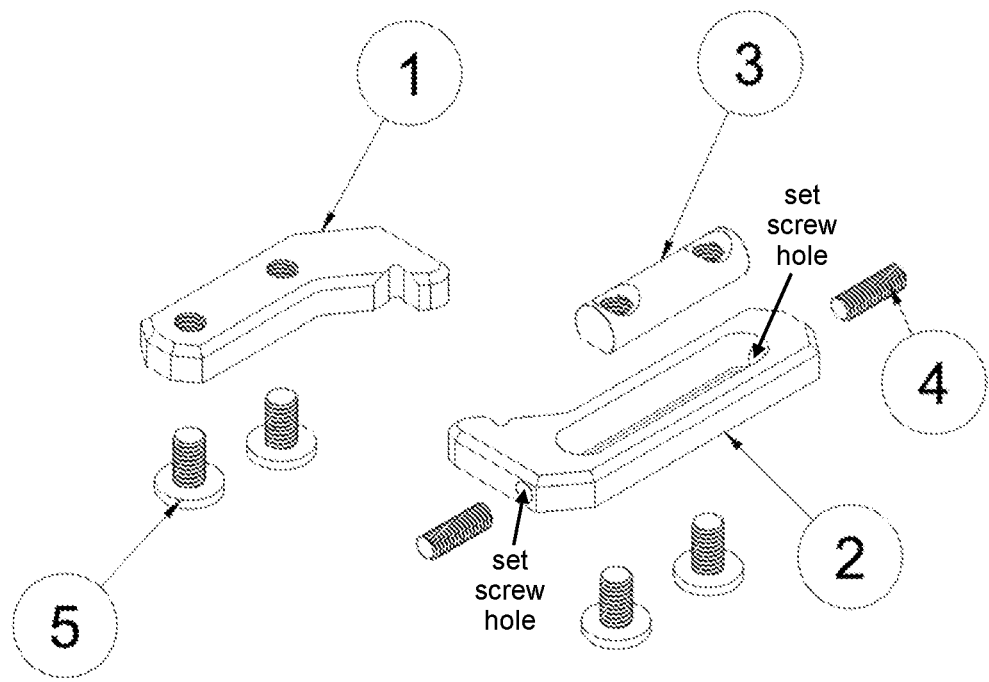
FIG. 22 shows exemplary components of a laterally adjustable hook system comprising set screws, according to an embodiment of the invention.

FIG. 21 shows an exploded view of the system of FIGS. 18-20, showing the general locations of the screws and set screws that secure the hooks. FIG. 22 shows exemplary components of the system of FIGS. 18-20, where a non-adjustable hook 1 is secured by screws 5, and a laterally adjustable hook 2 is secured by screws through a wedge nut 3 and set screws 4 through the laterally adjustable hook.

Statements Regarding Incorporation by Reference and Variations

All references cited throughout this application, for example patent documents including issued or granted patents or equivalents; patent application publications; and non-patent literature documents or other source material; are hereby incorporated by reference herein in their entireties, as though individually incorporated by reference.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps. All art-known functional equivalents of materials and methods are intended to be included in this disclosure.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a hook" includes a plurality of such hooks and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range and all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A laterally adjustable hook, comprising,
   a unitary body having a top surface, a bottom surface, a main portion and a nose portion extending from an end of the main portion such that the nose portion and the main portion are arranged substantially in an L-shape; and
   a rounded notch within an edge of the unitary body between the main portion and a tip of the nose portion, wherein the main portion comprises at least one oblong, beveled slot and at least one set screw hole aligned substantially parallel with a longitudinal axis of the at least one oblong, beveled slot.

2. The laterally adjustable hook of claim 1, wherein the nose portion extends substantially perpendicularly from the main portion.

3. The laterally adjustable hook of claim 1, wherein the nose portion extends from the main portion in only one direction.

4. The laterally adjustable hook of claim 1, wherein the beveled slot is wider at the top surface of the unitary body than at the bottom surface of the unitary body.

5. The laterally adjustable hook of claim 1, wherein the at least one set screw hole is a pair of set screw holes in the unitary body, wherein the pair of set screw holes is aligned substantially parallel with a longitudinal axis of the at least one oblong, beveled slot.

6. The laterally adjustable hook of claim 1, wherein a distal end of the nose portion is rounded.

7. The laterally adjustable hook of claim 1, wherein the top surface and the bottom surface of the unitary body are coplanar.

8. The laterally adjustable hook of claim 1, further comprising a substantially flat contact surface along the edge of the unitary body between the main portion and the rounded notch.

9. The laterally adjustable hook of claim 1, wherein the hook is fabricated by a method selected from the group consisting of 3D printing, casting, laser cutting, waterjet cutting, hand cutting and machining, computer numeric control (CNC) machining and combinations thereof.

10. A laterally adjustable hook system, comprising:
    the laterally adjustable hook of claim 1; and
    a wedge nut for applying pressure to edges of the oblong, beveled slot.

11. The laterally adjustable hook system of claim 10, wherein a length of the wedge nut is less than a length of the oblong, beveled slot.

12. The laterally adjustable hook system of claim 10, wherein the wedge nut has a substantially trapezoidal, square, diamond, triangular, hexagonal, circular or truncated circular cross-section.

13. The laterally adjustable hook system of claim 10, wherein the at least one set screw hole is a pair of set screw holes in the unitary body, wherein the pair of set screw holes is aligned substantially parallel with a longitudinal axis of the at least one oblong, beveled slot.

14. The laterally adjustable hook system of claim 13, further comprising a pair of set screws for contacting and laterally securing the wedge nut.

15. A laterally adjustable hook system, comprising:
    a unitary body having a top surface, a bottom surface, a main portion and a nose portion extending from an end of the main portion such that the nose portion and the main portion are arranged substantially in an L-shape, and a rounded notch within an edge of the unitary body between the main portion and a tip of the nose portion, wherein the main portion comprises at least one oblong, beveled slot;
    a pair of set screw holes in the unitary body, wherein the set screw holes are aligned substantially parallel with a longitudinal axis of the at least one oblong, beveled slot;
    a wedge nut for applying pressure to edges of the oblong, beveled slot; and
    a pair of set screws for contacting and laterally securing the wedge nut.

16. The laterally adjustable hook system of claim 15, wherein the beveled slot is wider at the top surface of the unitary body than at the bottom surface of the unitary body.

17. The laterally adjustable hook system of claim 15, wherein a length of the wedge nut is less than a length of the oblong, beveled slot.

18. The laterally adjustable hook system of claim 15, wherein the wedge nut has a substantially trapezoidal, square, diamond, triangular, hexagonal, circular or truncated circular cross-section.

19. The laterally adjustable hook system of claim 15, wherein a distal end of the nose portion is rounded.

20. The laterally adjustable hook system of claim 15, wherein the top surface and the bottom surface of the unitary body are coplanar.

\* \* \* \* \*